(12) United States Patent
Tomita et al.

(10) Patent No.: US 6,408,816 B1
(45) Date of Patent: Jun. 25, 2002

(54) CONTROL APPARATUS AND METHOD FOR DIRECT-INJECTION SPARK-IGNITION INTERNAL COMBUSTION ENGINE

(75) Inventors: Masayuki Tomita, Milton Keynes Bucks (GB); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/658,661

(22) Filed: Sep. 8, 2000

(30) Foreign Application Priority Data

Sep. 9, 1999 (JP) ............................................. 11-255648

(51) Int. Cl.⁷ ................................................ F02B 17/00
(52) U.S. Cl. ......................... 123/295; 60/285; 123/300
(58) Field of Search ................................. 123/295, 299, 123/300, 305; 60/274, 285

(56) References Cited

U.S. PATENT DOCUMENTS

| | | | | |
|---|---|---|---|---|
| 5,979,397 A | * | 11/1999 | Machida et al. | ............ 123/295 |
| 6,244,241 B1 | * | 6/2001 | Mamiya et al. | ............. 123/295 |
| 6,269,791 B1 | * | 8/2001 | Tanaka et al. | .............. 123/300 |

FOREIGN PATENT DOCUMENTS

| | | |
|---|---|---|
| JP | 62-191622 | 8/1987 |
| JP | 2-169834 | 6/1990 |
| JP | 10-169488 | 6/1998 |
| JP | 10-212986 | 8/1998 |
| JP | 10-212987 | 8/1998 |
| JP | 11-101147 | 4/1999 |
| JP | 11-324765 | * 11/1999 |

* cited by examiner

*Primary Examiner*—Tony M. Argenbright
(74) *Attorney, Agent, or Firm*—Foley & Lardner

(57) ABSTRACT

A control apparatus and method for a direct-injection spark-ignition internal combustion engine in which a stratified combustion is performed to raise an exhaust temperature under a condition prior to a completion of an engine warm-up. The stratified combustion is provided with a lean air-fuel mixture formed over a whole combustion chamber through a fuel injection at a suction stroke and a rich air-fuel mixture formed in an inner space surrounding a spark plug at the combustion chamber through a fuel injection at a compression stroke and a fuel injection quantity of the fuel injection at the suction stroke. A fuel injection quantity of the fuel injection at the compression stroke is corrected by use of a feedback correction coefficient so that an average air-fuel ratio over the whole combustion chamber is controlled to be a predetermined target air-fuel ratio.

18 Claims, 12 Drawing Sheets

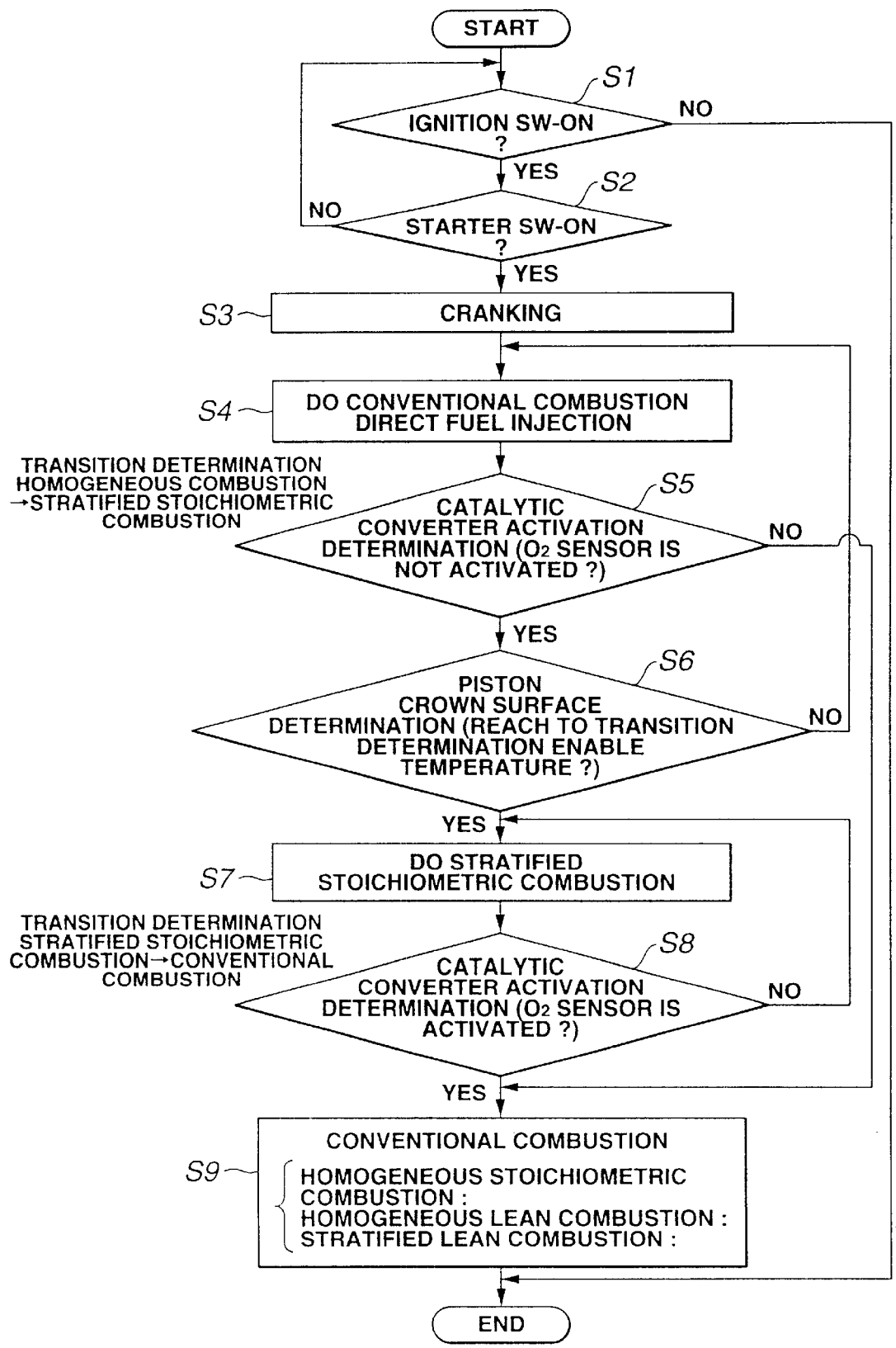

FIG.4
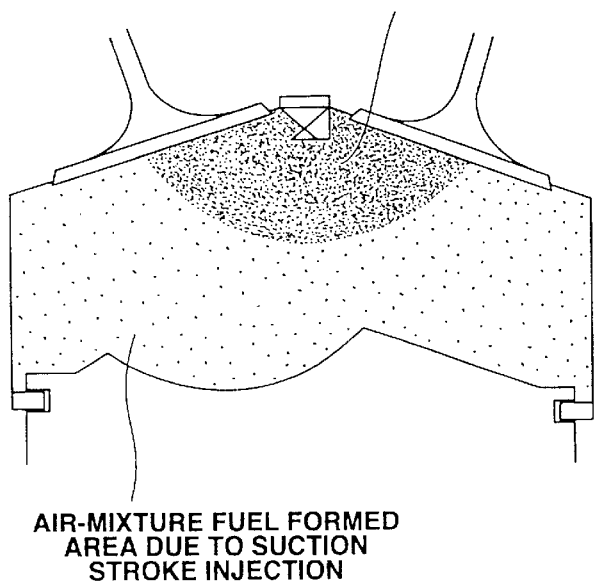
AIR-MIXTURE FUEL FORMED AREA DUE TO INJECTION AT COMPRESSION STROKE
AIR-MIXTURE FUEL FORMED AREA DUE TO SUCTION STROKE INJECTION
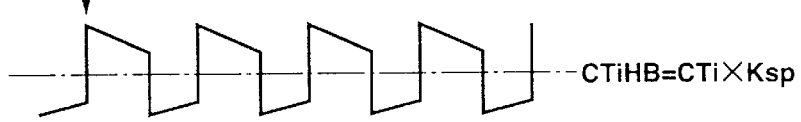
FIG.6A — $CTiHB = CTi \times Ksp$
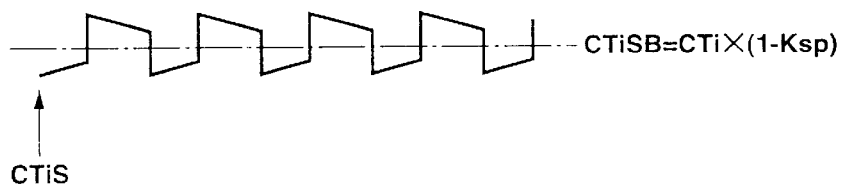
FIG.6B — $CTiSB = CTi \times (1-Ksp)$

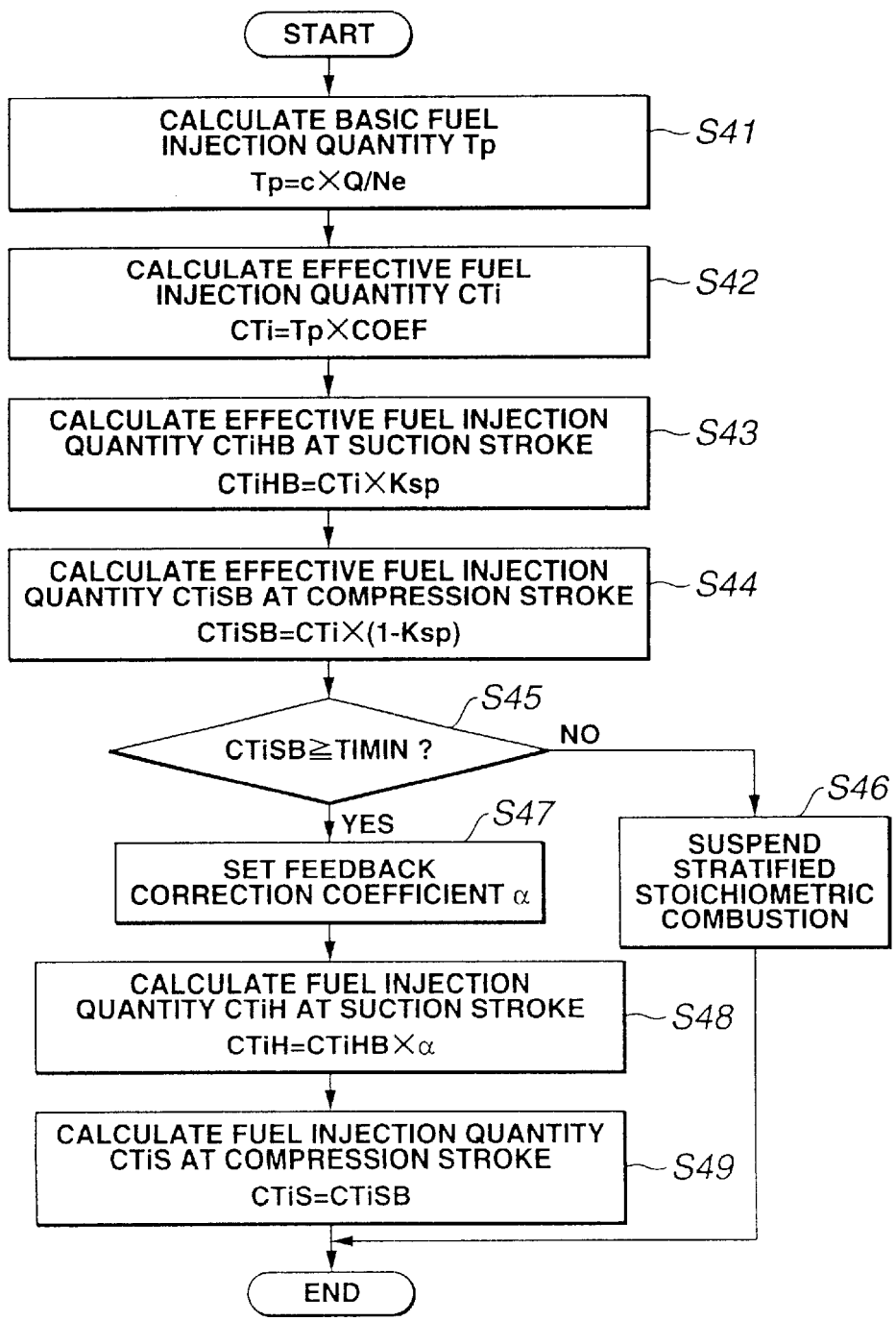

WHEN CTiSB≧TIMIN+A

WHEN CTiSB<TIMIN+A

WHEN CTiSB≧TIMIN+A

WHEN CTiSB<TIMIN+A

WHEN CTiS1≧TIMIN

WHEN CTiS1<TIMIN

CONTROL APPARATUS AND METHOD FOR DIRECT-INJECTION SPARK-IGNITION INTERNAL COMBUSTION ENGINE

BACKGROUND OF THE INVENTION a) Field of the Invention

The present invention relates to control apparatus and method for a direct-injection spark-ignition internal combustion engine.

b) Description of the Related Art

In recent years, internal combustion engines have been known in each of which fuel is injected directly into a combustion chamber of a corresponding engine cylinder, for example, a fuel combustion (so-called, a homogeneous combustion) is performed in a state wherein fuel is, under a normal driving condition, injected during a suction stroke (so that the injected fuel is diffused homogeneously over the whole combustion chamber) and another fuel combustion (so-called, a stratified lean combustion) at an extremely thin air-fuel ratio placed in a vicinity to a lean limit is performed in a state wherein fuel is injected directly into the combustion chamber during a compression stroke, under a predetermined driving condition, (a low-engine-speed-and-low-engine-load condition) so that a stratified air-mixture fuel is formed which is constituted by an air-mixture fuel of a combustible mixture ratio ignitable about its spark plug of the corresponding combustion chamber. This type of internal combustion engine is called a direct-injection spark-ignition internal combustion engine (refer to a Japanese Patent Application First Publication No. Showa 62-191622 published on Aug. 22, 1987 and a Japanese Patent Application First Publication No. Heisei 2-169834 published on Jun. 29, 1990).

SUMMARY OF THE INVENTION

A Japanese Patent Application First Publication No. Heisei 10-169488 published on Jun. 23, 1998 exemplifies a first previously proposed direct-injection spark-ignition internal combustion engine in which, during an engine operation from a cold start of the engine to a warm-up state, a local air-fuel ratio of a stratified air-mixture fuel in an inner space of the combustion chamber surrounding the spark plug is enriched so that a local insufficiency in air quantity is created, imperfectly combusted matter (CO) and part of fuel which remains unburned are reacted with an extra oxygen after a main combustion to raise exhaust temperature, thus an activation of an exhaust purification catalytic converter being promoted.

An assignee to which the present invention is to be assigned filed as an applicant Japanese Patent Application No. Heisei 11-46612 in Japan on Feb. 24, 1999. This Japanese Patent Application does not form prior art under 35 U.S.C. 102 and 35 U.S.C 103, and it does not form the state of the art under Article 54(2) EPC.

This Japanese Patent Application discloses a second previously proposed direct-injection spark-ignition internal combustion engine in which, to solve a problem of an increased exhaust quantity of an un-combusted fuel (HC) due to an unstable ignition of fuel in the above-described direct-injection spark-ignition internal combustion engine, the stratified air-mixture fuel is formed with the air-fuel ratio enriched locally around the spark plug and a sprayed fuel is sufficiently atomized through a retardation of an ignition timing at a later time than the normal stratified lean combustion so that a stable ignition-and-combustion is advanced, thus an activation of the exhaust purification catalytic converter being promoted and an exhaust of the un-combusted fuel (HC) being suppressed.

Furthermore, the above-described Japanese Patent Application discloses a stratified air-mixture fuel formed in an inner space of the combustion chamber surrounding the spark plug locally with the air-fuel ratio enriched and with the fuel injected during the compression stroke, the air-mixture fuel being formed over the whole combustion chamber with the fuel injected also during the suction stroke so that the air-mixture fuel is formed in which the air-mixture fuel over the whole combustion chamber is lean and a stratified stoichiometric combustion in which an average air-fuel ratio in this combustion chamber is set to indicate an approximately stoichiometric air-fuel ratio, this CO being developed due to a main combustion of the stratified air-mixture fuel and its fire flame being propagated over the whole corner of the combustion chamber by means of the enriched air-mixture fuel after the main combustion. Consequently, a more speedy re-combustion of CO can be achieved.

It is an object of the present invention is to provide control apparatus and method for a direct-injection spark-ignition internal combustion engine in which the above-described stratified stoichiometric combustion can normally and more favorably be carried out.

According to a first aspect of the present invention, there is provided a control apparatus for a direct injection spark-ignition internal combustion engine, comprising: a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug of the combustion chamber through a fuel injection at a compression stroke; and a second controlling section that corrects a fuel injection quantity of the fuel injection at the suction stroke and a fuel injection quantity of the fuel injection at the compression stroke by means of a feedback correction coefficient so that an average air-fuel ratio over the whole combustion chamber is controlled to be a predetermined target air-fuel ratio, wherein one of the fuel injections whose fuel injection quantity is larger than the other fuel injection is corrected in both increase and decrease directions by means of the feedback correction coefficient, and wherein the other fuel injection is corrected only in an increase direction by means of the feedback correction coefficient.

According to a second aspect of the present invention, there is provided a control apparatus for a direct-injection spark-ignition internal combustion engine, comprising: a fuel injector that injects fuel directly into a combustion chamber; an air-fuel ratio sensor provided in an exhaust passage of the engine; and a controller that is programmed to: set a feedback correction coefficient on the basis of an air-fuel ratio detected by the air-fuel ratio sensor in such a manner that the air-fuel ratio indicates a predetermined target air-fuel ratio; perform a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in an inner space surrounding the spark plug through a fuel injection at a compression stroke; and correct a fuel injection quantity of the fuel injection whose fuel injection quantity is larger than the other fuel injection by means of the feedback correction coefficient in both increase and decrease directions, and correct a fuel injection quantity of the other fuel injection by means of the feedback correction coefficient only in an increase direction.

According to a third aspect of the present invention, there is provided a control apparatus for a direct-injection spark-ignition internal combustion engine, comprising: a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug of the combustion chamber through a fuel injection at a compression stroke; and a second controlling section that corrects a fuel injection quantity of the fuel injection whose fuel injection quantity is larger than the other fuel injection quantity by means of a feedback correction coefficient so that an average air-fuel ratio over the whole combustion chamber is controlled to be a predetermined target air-fuel ratio, and suspends to correct a fuel injection quantity of the other fuel injection by means of the feedback correction coefficient.

According to a fourth aspect of the present invention, there is provided a control apparatus for a direct-injection spark-ignition internal combustion engine, comprising: a fuel injector that injects fuel directly into a combustion chamber; a spark plug provided in the combustion chamber; an air-fuel ratio sensor provided in an exhaust passage of the engine; and a controller that is programmed to: set a feedback correction coefficient on the basis of an air-fuel ratio detected by the air-fuel ratio sensor in such a manner that the air-fuel mixture ratio indicates a predetermined target air-fuel ratio; and perform a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in an inner space surrounding the spark plug through a fuel injection at a compression stroke; and correct a fuel injection quantity of the fuel injection whose fuel injection quantity is larger than the other fuel injection by means of the feedback correction coefficient, and suspend to correct a fuel injection quantity of the other fuel injection by means of the feedback correction coefficient.

According to a fifth aspect of the present invention, there is provided a control apparatus for a direct-injection spark-ignition internal combustion engine, comprising: a first controlling section that performs a stratified combustion to raise an exhaust temperature under a condition prior to a completion of an engine warm-up, the stratified combustion being provided with a lean air-fuel mixture formed over a whole combustion-chamber through a fuel injection at a suction stroke and a rich air-fuel mixture formed in an inner space surrounding a spark plug at the combustion chamber through a fuel injection at a compression stroke; a second controlling section that performs a first control mode, the first control mode correcting a fuel injection quantity of the fuel injection at the suction stroke and a fuel injection quantity of the fuel injection at the compression stroke by means of a feedback correction coefficient in both increase and decrease directions so that an average air-fuel ratio over the whole combustion chamber being controlled to be a predetermined target air-fuel ratio; a third controlling section that performs a second control mode, the second control mode correcting a fuel injection quantity of the fuel injection at the suction stroke and a fuel injection quantity of the fuel injection at the compression stroke by means of the feedback correction coefficient so that an average air-fuel ratio over the whole combustion chamber is controlled to be the predetermined target air-fuel ratio, wherein one of the fuel injections whose fuel injection quantity is larger than the other fuel injection is corrected in both increase and decrease directions by means of the feedback correction coefficient, and wherein the other fuel injection is corrected only in an increase direction by means of the feedback correction coefficient; and a switching section that switches a control mode between the first control mode and the second mode based on an engine operating condition.

According to a sixth aspect of the present invention, there is provided a control apparatus for a direct-injection spark-ignition internal combustion engine, comprising: a fuel injector that injects fuel directly into a combustion chamber; a spark plug provided in the combustion chamber; an air-fuel ratio sensor provided in an exhaust passage of the engine; a feedback correction coefficient setting section that sets a feedback correction coefficient on the basis of an air-fuel ratio detected by the air-fuel ratio sensor in such a manner that the air-fuel ratio indicates a predetermined target air-fuel mixture ratio; a stratified combustion controlling section that performs a stratified combustion to raise an exhaust temperature under a predetermined condition, the stratified combustion being provided with a lean air-fuel mixture formed over the. whole combustion chamber through a fuel injection at a suction stroke and a rich air-fuel mixture formed in an inner space surrounding the spark plug through a fuel injection at a compression stroke; a control mode switching section that switches a control mode between a first control mode and a second control mode based on an engine operating condition, the first control mode correcting a fuel injection quantity of the fuel injection at the suction stroke and a fuel injection quantity of the fuel injection at the compression stroke by means of the feedback correction coefficient wherein one of the fuel injections whose fuel injection quantity is larger than the other fuel injection is corrected in both increase and decrease directions by means of the feedback correction coefficient and wherein the other fuel injection is corrected only in an increase direction by means of the feedback correction coefficient.

According to a seventh aspect of the present invention, there is provided a control apparatus for a direct-injection spark-ignition internal combustion engine, comprising: a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug of the combustion chamber through a fuel injector at a compression stroke; a second controlling section that performs a first control mode, the first control mode correcting a fuel injection quantity of the fuel injection at the suction stroke and a fuel injection quantity of the fuel injection at the compression stroke by means of a feedback correction coefficient in both increase and decrease directions so that an average air-fuel ratio over the whole combustion chamber is controlled to be a predetermined target air-fuel ratio; a third controlling section that performs a second control mode, the second control mode correcting a fuel injection quantity of the fuel injection whose fuel injection quantity is larger than the other fuel injection by means of the feedback correction coefficient in both increase and decrease directions and suspending to correct a fuel injection quantity of the other fuel injection by means of the feedback correction coefficient; and a switching section that switches a control mode between the first control mode and the second control mode based on an engine operating condition.

According to an eighth aspect of the present invention, there is provided a control apparatus for a direct-injection spark-ignition internal combustion engine, comprising: a fuel injector that injects fuel directly into a combustion chamber; a spark plug provided in the combustion chamber; an air-fuel ratio sensor provided in an exhaust passage of the engine; a feedback correction coefficient setting section that sets a feedback correction coefficient on the basis of an air-fuel ratio detected by the air-fuel ratio sensor in such a manner that the air-fuel ratio indicates a predetermined target air-fuel ratio; a stratified combustion controlling section that performs a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in an inner space surrounding the spark plug through a fuel injection at a compression stroke; and a control mode switching section that switches a mode between a first control mode and a second control mode based on an engine operating condition, the first control mode correcting a fuel injection quantity of the fuel injection at the suction stroke and a fuel injection quantity of the fuel injection at the compression stroke by means of the feedback correction coefficient in both increase and decrease directions, the second control mode correcting a fuel injection quantity of the fuel injection whose fuel injection quantity is larger than the other fuel injection by means of the feedback correction coefficient in both increase and decrease directions, and suspending to correct a fuel injection quantity of the other fuel injection by means of the feedback correction coefficient.

According to a ninth aspect of the present invention, there is provided a control apparatus for a direct-injection spark-ignition internal combustion engine, comprising: a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug of the combustion chamber through a fuel injection at a compression stroke; and a second controlling section that corrects a fuel injection quantity at the suction stroke and a fuel injection quantity of the fuel injection at the compression stroke by means of a feedback correction coefficient so that an air-fuel mixture ratio over the whole combustion chamber is controlled to be a predetermined target air-fuel ratio, wherein one of the fuel injections whose fuel injection quantity is larger than the other fuel injection is corrected in both increase and decrease directions by means of the feedback correction coefficient and the other fuel injection is corrected in both increase and decrease directions by means of the feedback correction coefficient so as to be limited to a quantity greater than or equal to a minimum quantity.

According to a tenth aspect of the present invention, there is provided a control apparatus for a direct-injection spark-ignition internal combustion engine, comprising: a fuel injector that injects fuel directly into a combustion chamber; a spark plug provided in the combustion chamber; an air-fuel ratio sensor provided in an exhaust passage of the engine; and a controller that is programmed to: set a feedback correction coefficient on the basis of an air-fuel ratio detected by means of the air-fuel ratio sensor in such a manner that the air-fuel ratio indicates a predetermined target air-fuel ratio; perform a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in inner space of the combustion chamber surrounding the spark plug through a fuel injection within the combustion chamber at a compression stroke; and correct a fuel injection quantity of the fuel injection at the suction stroke and a fuel injection quantity of the fuel injection at the compression stroke by means of the feedback correction coefficient so that the detected air-fuel ratio is controlled to be a predetermined target air-fuel ratio, wherein one of the fuel injections whose fuel injection quantity is larger than the other fuel injection is corrected in both increase and decrease directions by means of the feedback correction coefficient so as to be limited to a quantity greater than or equal to a minimum quantity.

According to an eleventh aspect of the present invention, there is provided a control method for a direct-injection spark-ignition internal combustion engine, comprising: forming a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug at the combustion chamber through a fuel injection at a compression stroke; and correcting a fuel injection quantity of the fuel injection at the suction stroke and a fuel injection quantity of the fuel injection at the compression stroke by means of a feedback correction coefficient so that an average air-fuel ratio over the whole combustion chamber is controlled to be a predetermined target air-fuel ratio, wherein one of the fuel injections whose fuel injection quantity is larger than the other fuel injection is corrected in both increase and decrease directions by means of the feedback correction coefficient, and wherein the other fuel injection is corrected only in an increase direction by means of the feedback correction coefficient.

This summary of the invention does not necessarily describe all necessary features so that the invention may also be a sub-combination of these described features.

BRIEF DESCRIPTION OF THE DRAWINGS

FIG. 2 is an operational flowchart for explaining a combustion control procedure executed in the control unit shown in FIGS. 1A and 1B.

FIG. 4 is a schematic diagram of the direct-injection spark-ignition engine for explaining a formation. of an air-mixture fuel in the corresponding combustion chamber in a stratified stoichiometric combustion state.

FIGS. 6A and 6B are integrally a timing chart for explaining variation patterns of fuel injection quantities at a suction stroke of its corresponding combustion chamber and at a compression stroke thereof in the first example of the fuel injection quantity control shown in FIG. 5.

FIG. 8 is a timing chart for explaining variation patterns of fuel injection quantity injected at the compression stroke in the second example of the fuel injection quantity control shown in FIG. 7.

FIG. 9 is an operational flowchart for explaining a third example of the fuel injection control procedure executed in the control unit shown in FIGS. 1A and 1B.

DETAILED DESCRIPTION OF THE PREFERRED EMBODIMENT

Reference will hereinafter be made to the drawings in order to facilitate a better understanding of the present invention.

Figure 1A:
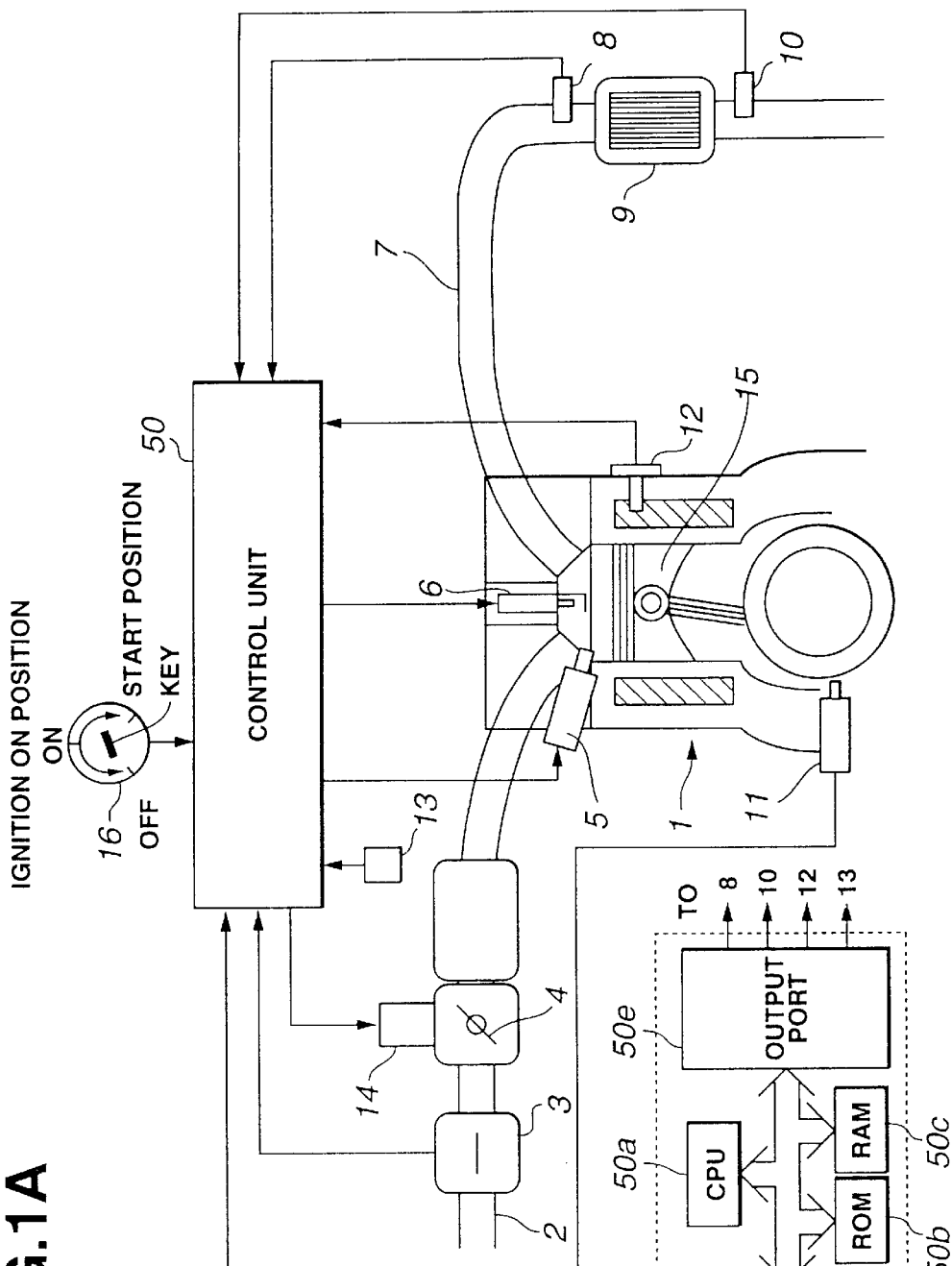
FIG. 1A is a schematic system configuration view of a preferred embodiment of a control apparatus applicable to a direct-injection spark-ignition internal combustion engine.

FIG. 1A shows a system configuration of a first preferred embodiment of a control apparatus for a direct-injection spark-ignition internal combustion engine.

An air-flow meter 3 to detect intake-air flow quantity Qa and a throttle valve 4 to adjust intake-air quantity Qa are installed. A fuel injector 5 is exposed to the combustion chamber of each cylinder.

Fuel injector 5 is driven to open its nozzle in response to a drive pulse signal set by a control unit 50 as will be described later.

Fuel injector 5 is so constructed that fuel pressurized and supplied from a fuel pump (not shown) and controlled at a predetermined pressure by means of a. pressure regulator can directly be injected within the combustion chamber.

A spark plug 6 to perform an ignition for the sucked air-mixture fuel on the basis of an ignition signal from the control unit 50 is installed for each cylinder.

On the other hand, an air-fuel ratio sensor 8 to detect an air-fuel mixture ratio of exhaust gas and, in turn, sucked air-mixture fuel by detecting a concentration of a particular component (for example, oxygen) in the exhaust gas is interposed within an exhaust passage 7.

The air-fuel ratio sensor 8 may be an exygen sensor which outputs a voltage signal corresponding to a rich or lean with respect to a stoichiometric air-fuel mixture ratio or may be a wide range air-fuel ratio sensor which detects linearly the air-fuel ratio over a wide range. An exhaust purification catalytic converter 9 to purify the exhaust gas is interposed at a downstream side of exhaust passage 7. It is noted that a three-dimensional catalysis or an oxidation of CO and HC in the exhaust gas in a vicinity to a stoichiometric air-fuel mixture ratio $\{\lambda=1, A/F$ (air weight/fuel weight)$=14.7\}$ may be used as the catalytic converter 9.

An oxygen sensor 10 (hereinafter, called a downstream side $O_2$ sensor) which outputs a voltage signal indicating a rich state or lean state with respect to the stoichiometric air-fuel mixture ratio is disposed on a downstream side of the exhaust purification catalytic converter 9 to detect the concentration of the particular exhaust component (for example, oxygen).

In the embodiment, a quantitative correction for the air-fuel ratio feedback control based on the detected value of the air-fuel ratio sensor 8 is made according to the detected value of the oxygen ($O_2$) sensor 10. Hence, the downstream side $O_2$ sensor 10 is installed to suppress a control developed due to a deterioration of the air-fuel ratio sensor 8 (to adopt a, so-called, double air-fuel ratio sensor system).

In a case where the air-fuel mixture ratio feedback control based on the detected value of only the air-fuel ratio sensor 8 is carried out, the downstream side $O_2$ sensor 10 may be omitted. In addition, in another case where the air-fuel ratio feedback control is not carried out, both of the air-fuel ratio sensor 8 and downstream side $O_2$ sensor 10 may be omitted.

A crank angle sensor 11 is, in the embodiment, disposed. Control unit 50 counts a crank unit angle signal outputted in synchronization with an engine revolution for a constant interval of time or alternatively measures a period of a crank reference angle signal so that an engine speed Ne can be detected.

A coolant temperature sensor 12 to detect a coolant temperature Tw within a coolant jacket is exposed to the coolant jacket of the engine 1.

Furthermore, a throttle sensor 13 (can also be functioned as an idle switch) to detect an opening angle of the throttle valve 4 is installed.

In the preferred embodiment, a throttle valve controller 14 is disposed in which an actuator such as a DC motor is installed to enable an opening angle of the throttle valve 4 to be controlled.

Throttle valve controller 14 electronically controls the opening angle of throttle valve 4 in response to a drive signal from control unit 50 so that a demand torque calculated on the basis of a vehicular occupant accelerator pedal manipulated variable can be achieved.

Figure 1B:
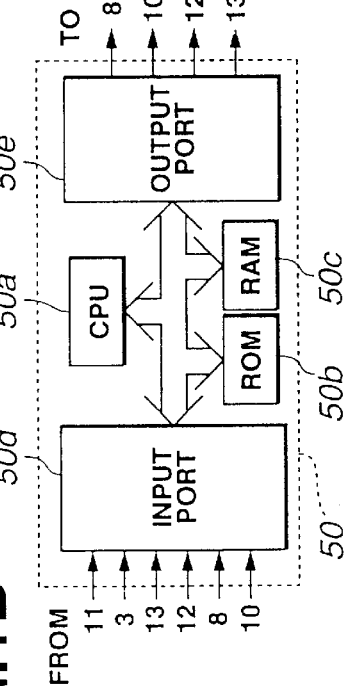
FIG. 1B is a schematic circuit block diagram of a control unit shown in FIG. 1A.

Detection signals from various sensors are inputted. to control unit 50 which is constituted by a microcomputer including a CPU (Central Processing Unit) 50*a*, ROM (Read Only Memory) 50*b*, RAM (Random Access Memory) 50*c*, an Input/Output Interface having an A/D converter, Input Port 50*d*, and Output Port 50*e*, and a common bus as shown in FIG. 1B.

Control unit 50 controls the opening angle of the throttle valve 4 via the throttle valve controller 14 in accordance with an engine driving condition detected on the basis of the signals from various sensors described above, controls a fuel injection quantity (fuel supply quantity) by driving the fuel injector 5 for each cylinder, and controls an ignition timing through each spark plug 6.

It is noted that while, for example, a stratified combustion can be achieved such that fuel is injected into the corresponding combustion chamber during the compression stroke under a predetermined engine driving condition (a low-and-middle load engine) so that a combustible air-mixture fuel can be formed in a stratified form around the spark plug 6 within the corresponding combustion chamber, a homogeneous combustion can be carried out such that fuel is injected during a suction stroke under other driving condition (such as a high load engine) so that the air-mixture fuel having an approximately homogeneous air-mixture fuel over the whole cylinder is formed. To achieve these formations of stratified combustion and homogenous combustion, a modification according to the engine driving condition can be made for a fuel injection timing.

In control unit 50 of the preferred embodiment, while suppressing the exhaust gas component of HC (Hydrogen Carbon) into the air during a time interval at which the. exhaust purification catalytic converter 9 is activated from a time at which engine 1 is started up to a time at which exhaust purification catalytic converter 9 is activated, an earlier activation of exhaust catalytic converter 9 can be achieved. To achieve this, control unit 50, for example, carries out the following control procedure upon a receipt of the input signals from the above-described sensors such as a key switch 16.

It is noted that since a mean (average) air-fuel ratio within the combustion chamber provides substantially the stoichiometric air-fuel mixture ratio when the stratified combustion used to raise the exhaust temperature is carried out, a combustion pattern thereof is represented as a stratified stoichiometric combustion.

Specifically, FIG. 2 shows an operational flowchart executed by control unit 50 shown in FIGS. 1A and 1B.

At a step S1 in FIG. 2, control unit 50 determines whether an ignition signal of key switch 16 is turned to ON (a key position is placed at an ON position of the ignition switch).

If YES at a step S1 (IGNITION SWITCH OFF→ON), the routine shown in FIG. 2 goes to a step S2 and a step S3.

If No at the step S1, the present routine of FIG. 2 is immediately ended.

At step S2, control unit 50 determines whether a start signal of the key switch 16 is turned to ON (key position is placed at a start position).

Namely, control unit 50 determines if a cranking request through a starter motor (not shown) is present at a step S2.

If YES at a step S2, control unit 50 determines that the engine cranking start request is present and the routine goes to a step S3.

If no cranking request is present at step 52 (No), control unit 4 determines that there is still waiting for the cranking request and the routine is returned to step S1.

At a step S3, control unit 50 starts the drive of a starter motor to perform an engine cranking.

Figure 3A:
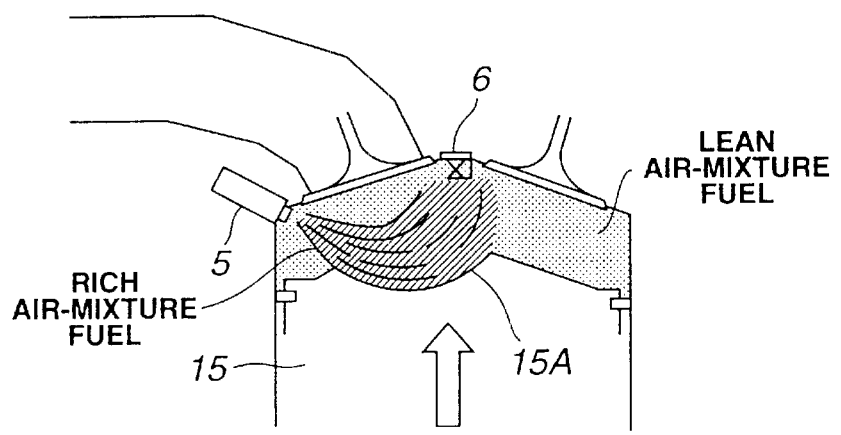
FIG. 3A is a schematic explanatory view of the direct-injection spark-ignition engine for explaining a fuel injection during a compression stroke of its corresponding combustion chamber.
Figure 3B:
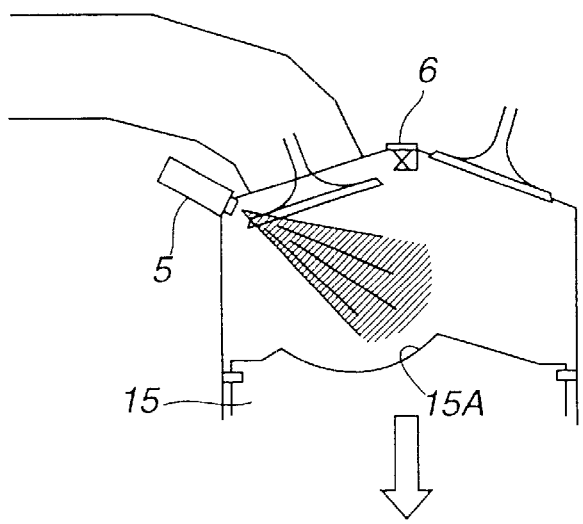
FIG. 3B is a schematic explanatory view of the direct-injection spark-ignition engine for explaining a fuel injection during a suction stroke of its corresponding combustion chamber.

At a step S4, control unit 50 carries out a fuel injection to start the engine 1 {refer to FIG. 3B for a direct fuel injection at a suction stroke} so that the drive of engine 1 (a direct injection homogeneous combustion) is performed.

At a step S5, control unit 50 determines whether the exhaust purification catalytic converter 9 is activated. This determination may, for example, be replaced with a determination of whether downstream side $O_2$ sensor 10 exposed to an exhaust passage 7 is activated.

That is to say, depending on whether exhaust purification catalytic converter 9 has been activated can be determined on the basis of a variation pattern of the detection signal of downstream side $O_2$ sensor 10.

In addition, control unit 50 may estimate a temperature (or an outlet temperature) of the exhaust purification catalytic converter 9 by detecting an engine coolant temperature Tw or lubricant temperature and may determine the activation of the exhaust purification catalytic converter 9 on the basis of a result of estimated temperature of the catalytic converter 9, or may determine the detection of the temperature (or outlet temperature) of exhaust purification catalytic converter 9 directly.

If the catalytic converter 9 is not yet activated (Yes) at step S5, control unit 50 carries out the stratified stoichiometric combustion when a state transition enabling condition to the stratified stoichiometric combustion is established at a step S6 as will be described later.

On the other hand, if exhaust purification catalytic converter 9 has already been activated (No) at step S5, control unit 50 determines that no control to promote a catalytic converter activation is needed and the routine goes to a step S9. At step S9, control unit 50 performs a combustion form as is conventionally known in accordance with the engine driving condition in order to save fuel consumption.

Then, the present operational flowchart shown in FIG. 2 is ended.

At step S6, control unit 50 determines whether the transition enabling condition to the stratified stoichiometric combustion is established.

Specifically, when a temperature condition of the combustion chamber is estimated and the estimated temperature becomes equal to or above a predetermined temperature so that a favorable ignitability-and-combustibility and engine stability (engine driveability) can be achieved. Thus, the routine goes to step S7.

On the other hand, in a case where the determination is No (at step S6) and stratified stoichiometric combustion to promote the catalytic converter activation as will be described later is carried out, the temperature in the combustion chamber is lower than a predetermined value so that a promotion of atomization and gasification of the stratified stoichiometric air-mixture fuel cannot favorably be carried out. Consequently, there is a possibility of reducing the ignitability, combustion stability, and engine stability (engine driveability). Consequently, the transition to the stratified stoichiometric combustion is inhibited to continue with the direct fuel injection (direct injected homogeneous combustion) at the suction stroke. Then, the routine is returned to a step S4.

At step S7, since this step enters in the case where the catalytic converter activation promotion is needed when catalytic converter 9 is not activated, the combustion chamber temperature is equal to or above a predetermined temperature, and the generation of the stratified air-mixture fuel can favorably be carried out. Thus, the transition of the engine combustion to the stratified stoichiometric combustion is enabled to promote the catalytic converter activation so that the stratified stoichiometric combustion can be performed.

Figure 3C:
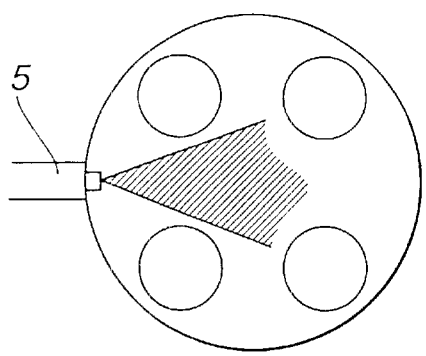
FIG. 3C is a plan view of the direct-injection spark-ignition engine for explaining the fuel injection through a fuel injector shown in FIG. 1A.

Specifically, a weight of fuel, for example, approximately 50% to approximately 90% from among a total fuel quantity (a fuel weight required to achieve an approximately stoichiometric air-fuel mixture ratio) by which an approximately perfect combustion can be made with the intake-air quantity per one combustion cycle so that a homogeneous air-mixture fuel is formed which is relatively lean with respect to the stoichiometric air-fuel mixture ratio over the whole combustion chamber (formed according to the fuel injection shown in FIGS. 3B and 3C) and the remaining fuel having the weight from approximately 50% to approximately 10% is injected into the corresponding combustion chamber at its compression stroke so that the injected fuel is combusted (refer to FIG. 4) with the air-mixture fuel (high fuel concentration) which is relatively rich with respect to the stoichiometric air-fuel ratio around its corresponding spark plug 6 {refer to FIG. 3A} formed in a stratification.

It is noted that, in the stratified stoichiometric combustion form, a ratio of the fuel injection quantity during the suction stroke to that during the compression. stroke (hereinafter, referred to as a divisional ratio) may be set so that the air-fuel ratio of the air-mixture fuel which is leaner than the stoichiometric air-fuel mixture ratio of the air-mixture fuel formed in the corresponding combustion chamber during the suction stroke gives 16 through 28 and that formed in the inner space around the corresponding spark plug through the fuel injection during the compression stroke and which is richer than the stoichiometric air-fuel mixture ratio gives 9 through 13.

An air-fuel mixture ratio feedback control is performed on the basis of detected values of air-fuel ratio sensor 8 and downstream side $O_2$ sensor 10 so that the air-fuel ratio in each air-mixture fuel layer is set to fall in the above-described range.

The stratified stoichiometric combustion described above cannot only raise the exhaust temperature but also can reduce the un-combusted quantity of HC exhausted from the corresponding combustion chamber to the exhaust passage, as compared with a well known homogeneous stoichiometric combustion.

That is to say, according to the stratified stoichiometric combustion, the exhaust of HC into the atmosphere during a time interval from the engine start up to exhaust purification catalytic converter 9 can be suppressed and an earlier activation of exhaust purification catalytic converter 9 can remarkably be promoted.

Next, at a step S8, control unit 50 determines if exhaust purification catalytic converter 9 has been activated (the engine warm-up has completed) in the same manner as described at step S5.

If Yes at step S8, the routine of FIG. 2 advances to a step S10.

If No at step S8, the routine in FIG. 2 is returned to step S7 in which the stratified stoichiometric combustion is continued until exhaust purification catalytic converter 9 has been activated.

At step S9, the combustion state is transferred to such combustion states as homogeneous stoichiometric combustion, the homogeneous lean combustion, or stratified lean combustion and the routine of FIG. 2 is ended.

Next, a first example of a fuel injection quantity control during the stratified stoichiometric combustion to be executed by the control apparatus in the preferred embodiment will be described below.

Figure 5:
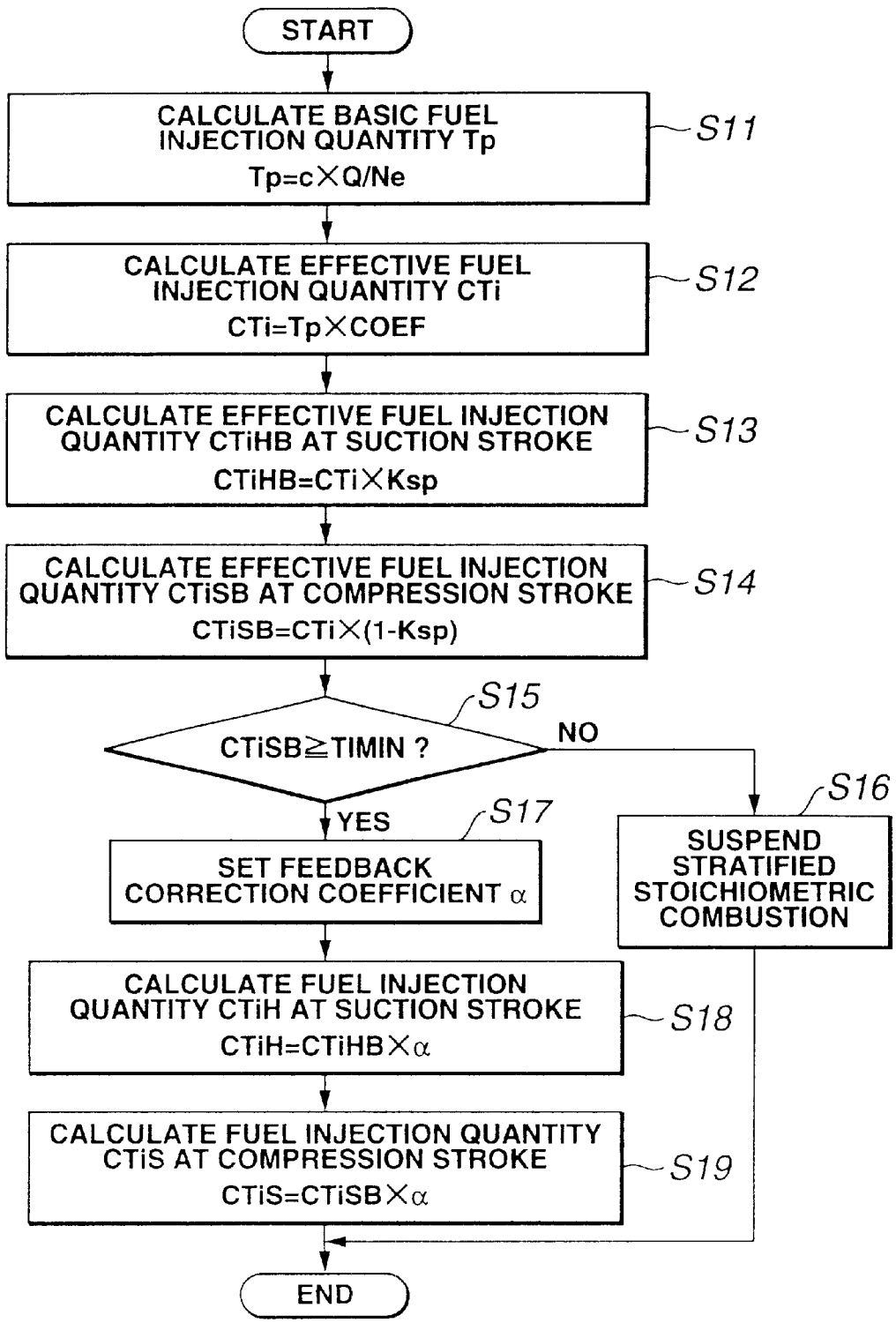
FIG. 5 is an operational flowchart for explaining a first example of a fuel injection control procedure executed in the control unit shown in FIGS. 1A and 1B.

FIG. 5 shows an operational flowchart of the first example of the fuel injection quantity control.

At a step S11, control unit 50 reads a voltage signal from air-flow meter 3 the crank angle signal from the crank angle sensor 11, calculates intake-air flow quantity Qa and engine speed Ne, and calculates a basic fuel injection quantity Tp from Qa and Ne as follows:

$$Tp=c \times Qa/Ne \text{ (c denotes a constant)} \qquad (1).$$

At a step S12, control unit 50 calculates an effective fuel injection quantity CTi by correcting the basic fuel injection quantity Tp with various correction coefficients KOFF such as a coolant temperature correction coefficient Kw for the value of Tp to be corrected toward a rich direction to secure the engine stability during a low coolant temperature and a start and an after-start increment correction coefficient Kas:

$$CTi=Tp \times COEF \qquad (2).$$

At a step S13, effective fuel injection quantity at the suction stroke CTiHB is set using the divisional ratio Ksp according to the following equation:

$$CTiHB=CTi \times Ksp \qquad (3).$$

In the equation (3), the divisional ratio Ksp is set as a ratio CTiH of fuel injection quantity at the suction stroke in a gross fuel injection quantity (=CTiH+CTiS) which is a sum of the fuel injection quantity CTiH at the suction stroke and that CTiS at the compression stroke. Hence, the divisional ratio of the fuel injection CTiS at the compression stroke to the gross fuel injection quantity indicates (1−Ksp) which may variably be set according to the engine driving condition. The divisional ratio Ksp, hence, may be fixed or may be varied according to the engine driving condition.

At a step S14, control unit 50 calculates the effective fuel injection quantity CTiSB at the compression stroke in accordance with the following equation:

$$CTiSB=CTi \times (1-Ksp) \qquad (4).$$

At a step S15, control unit 50 compares effective fuel injection quantity CTiSB at a compression stroke when fuel injection quantity is smaller than CTiHB at the suction stroke with a minimum quantity TIMIN which is enabled to be injected through the corresponding fuel injector 5 to determine if CTiSB≧TIMIN.

If CTiSB<TIMIN (No) at step S15, control unit 50 determines that the substantial fuel injection at the compression stroke is not carried out and the normal stratified stoichiometric combustion cannot be carried out any more and the routine goes to a step S16. At step S16, control unit 50 halts the stratified stoichimetric combustion (and the combustion state is switched into another combustion).

On the other hand, if CTiSB≧TIMIN (Yes) at step S15, the present routine goes to a step S17.

At step S17, control unit 50 sets an air-fuel mixture ratio feedback correction coefficient α through a Proportional Integration (PI) control on the basis of a result of detection of the air-fuel ratio by the air-fuel mixture sensor 8 disposed at an upstream side of the exhaust purification catalytic converter 9.

At the next step S18, control unit 50 calculates a final fuel injection quantity CTiH at the suction stroke using the following equation by means of air-fuel ratio feedback correction coefficient α:

$$CTiH = CTiHB \times \alpha \quad (5).$$

At the next step S19, control unit 50 calculates a final fuel injection quantity CTiS at the compression stroke using the following equation (6) by correcting the effective fuel injection quantity CTiSB at the compression stroke with the air-fuel mixture ratio feedback correction coefficient α.

$$CTiS = CTiSB \times \alpha \quad (6).$$

FIGS. 6A and 6B shows a variation pattern of the fuel injection quantities at the suction stroke and at the compression stroke when the first example of the fuel injection quantity control shown in FIG. 5 is executed.

Since as described above with reference to the flowchart of FIG. 5, in the air-fuel mixture ratio feedback control, both of the fuel injection quantity at the suction stroke and that at the compression stroke are corrected with the feedback correction coefficient α, the divisional ratio of the fuel injection quantity can be maintained at constant and the stable combustion performance can be secured.

In a case where the minimum fuel injection quantity (the fuel injection quantity normally at the compression stroke) that the corresponding fuel injector 5 can, at minimum, inject is small and the normal fuel injection can be assured even if one of the fuel injection quantities. at the suction stroke and at the compression stroke which is smaller (less) than the other undergoes the decrease directional correction by means of the feedback correction coefficient α, the execution of air-fuel mixture control described with reference to FIG. 5 can achieve the most favorable stratified stoichiometric combustion performance.

It is noted that the fuel injection at the suction stroke can be carried out using another fuel injector which is disposed so that the injected fuel is directed to the intake port. Since, in this case, a small quantitative capacity fuel injector as the fuel injector which injects fuel within the combustion chamber, hence, a less minimum fuel injection quantity can be used, it is easy for the control apparatus to adopt the control procedure in the first example.

Next, a second example of the fuel injection quantity control during the stratified stoichiometric combustion will be described with reference to the flowchart shown in FIG. 7.

It is noted that steps S21 through S28 are the same as those steps S11 through S18.

While the stratified stoichiometric combustion is executed, the fuel injection quantity CTiH at the suction stroke which is larger than that at the compression stroke (for example, the divisional ratio Ksp is about 65%) corrects effective fuel injection quantity CTiHB with feedback correction coefficient α.

At a step S29, control unit 50 determines whether feedback correction coefficient α indicates 1 or more (100% or more). If α≧1 (Yes) at step S29, control unit 50 determines that the fuel injection quantity is corrected in the increase direction and the routine goes to a step. S30.

At step S30, control unit 50 sets the final fuel injection quantity CTiS by correcting effective fuel. injection quantity CtiSB at the compression stroke which is smaller than that at the compression stroke (for example, the divisional ratio (1−Ksp) is about 35%) with the feedback correction coefficient a equal to or above 1 in the increase direction.

On the other hand, if α<1 (No) at step S29, control unit 50 determines that the correction of the fuel injection quantity in the decrease direction is carried out and the routine goes to a step S31.

At step S31, control unit 50 calculates and outputs the final injection quantity CTiS which is equal to effective fuel injection quantity CTiSB at compression stroke without correction by means of feedback correction coefficient α.

Figure 7:
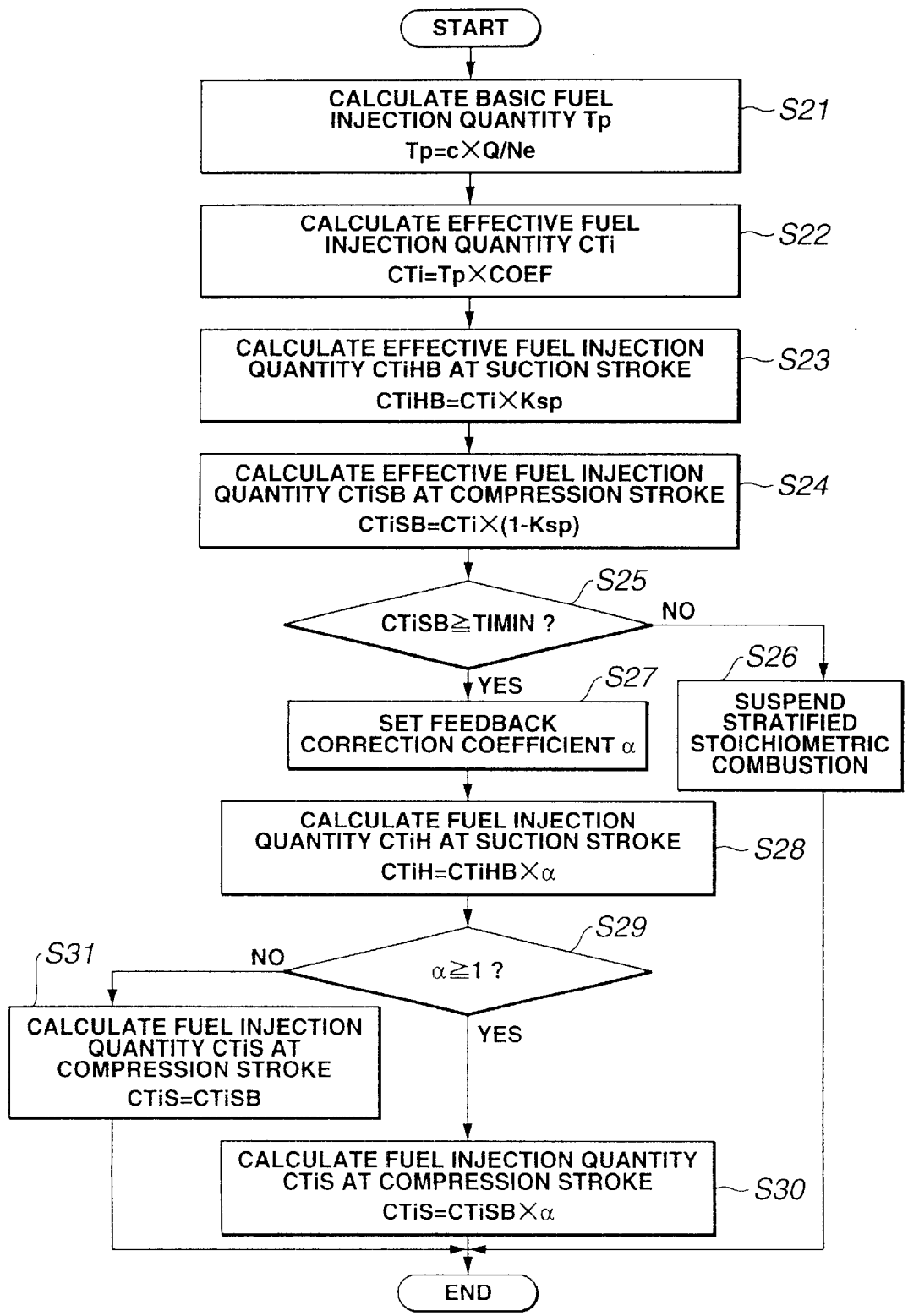
FIG. 7 is an operational flowchart for explaining a second example of the fuel injection control procedure executed in the control unit shown in FIGS. 1A and 1B.

FIG. 8 shows the variation pattern of the fuel injection quantity at the compression stroke in a case where the fuel injection quantity control shown in FIG. 7 is carried out.

As described above, the correction of the smaller fuel injection quantity at the compression stroke with the feedback correction coefficient is not carried out. Hence, the fuel injection quantity control shown in FIG. 7 can prevent the fuel injection from being substantially stopped and can secure the normal stratified stoichiometric combustion.

Next, FIG. 9 shows a third example of the fuel injection control during the stratified stoichiometric combustion.

The contents of steps S41 through S48 are the same as those steps S11 through S18. While the stratified. stoichiometric combustion is executed, the fuel injection quantity CTiH at suction stroke is set with the effective fuel injection quantity CTiHB corrected by means of the feedback correction coefficient α.

On the other hand, for the fuel injection quantity at the compression stroke, control unit 50 outputs effective fuel injection quantity CTiSB set at step S44 directly without correction with feedback correction coefficient α as the final fuel injection quantity CTiS at step S49.

Figure 10:
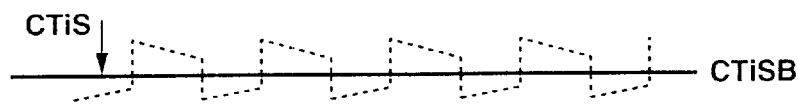
FIG. 10 is a timing chart for explaining a variation pattern of fuel injection quantity injected at the compression stroke in the third example of the fuel injection quantity control procedure shown in FIG. 9.

FIG. 10 shows the variation pattern of the fuel injection quantity at the compression stroke in a case where the fuel injection quantity control shown in FIG. 9 is carried out.

As shown in FIGS. 9 and 10, the smaller fuel injection quantity at the compression stroke does not undergo the correction thereof using the feedback correction coefficient. Hence, the fuel injection control in the case of FIG. 9 can prevent the fuel injection from being substantially stopped and the normal stratified stoichiometric combustion can be secured. The deviation of the divisional ratio in the case of the third example is large as compared with that in the case of the second example but the fuel injection quantity control becomes easier than that in the second example.

The contents of steps S51 through S58 are the same as those of steps S11 through S18 in the case of the first example. While the stratified stoichiometric combustion is executed, the final injection quantity CTiH during the suction stroke is set with the effective fuel injection quantity CtiHB corrected by means of feedback correction coefficient α.

Figure 11:
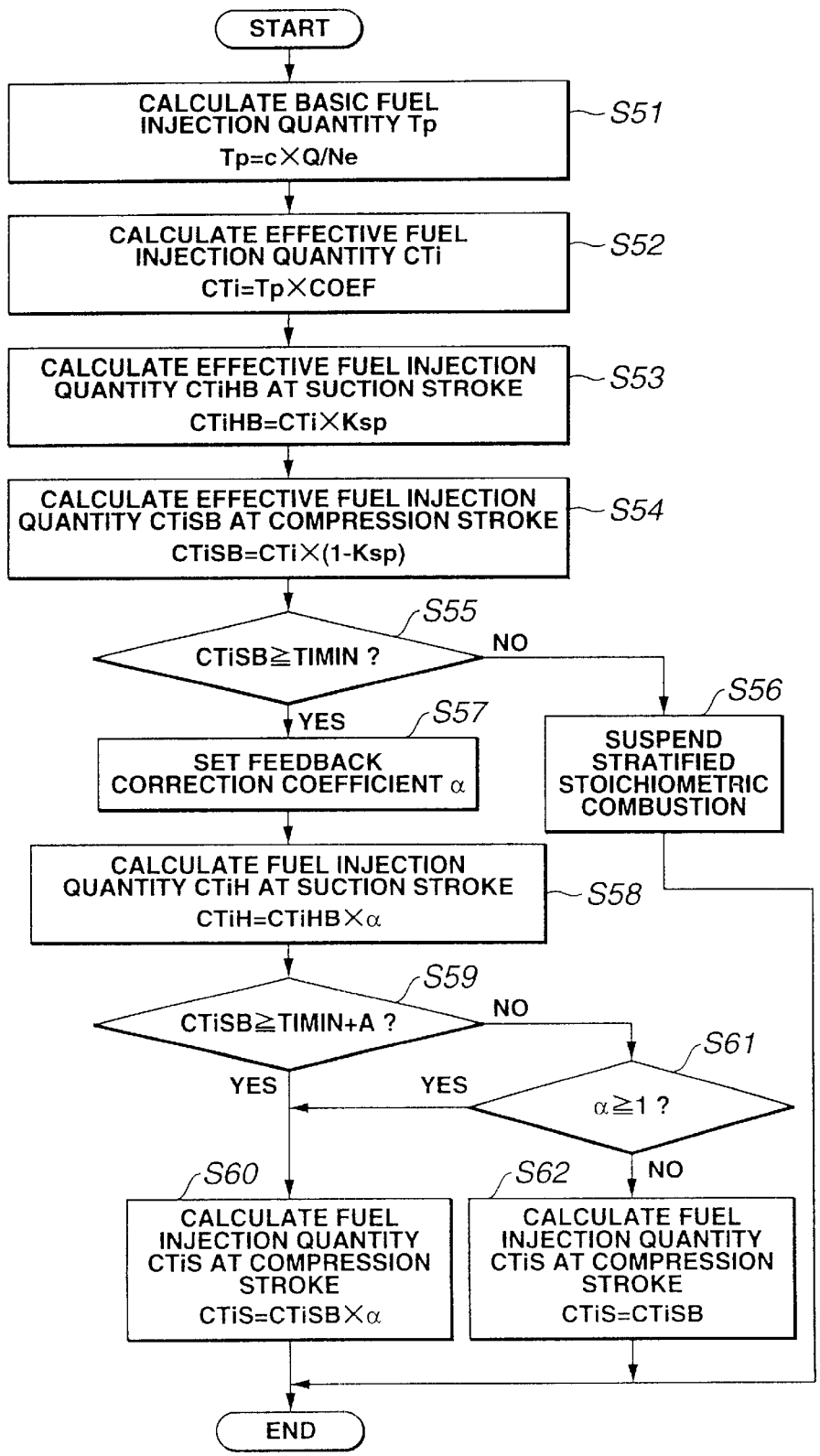
FIG. 11 is an operational flowchart for explaining a fourth example of the fuel injection control procedure executed in the control unit shown in FIGS. 1A and 1B.

At a step S59 in FIG. 11, control unit 50 determines whether effective fuel injection quantity CtiSB at the compression stroke whose quantity value is smaller is equal to or above a predetermined value (=TIMIN+A).

The predetermined value of A is set to a value corresponding to the injection quantity which corresponds to a largest deviation that can take the reference value (=1) of the feedback correction coefficient α in the decrease direction. That is to say, even if the fuel injection is corrected in the decrease direction at maximum by means of feedback correction coefficient α. The fuel injection quantity equal to or above the injection enabling minimum value TIMIN can be secured.

If effective fuel injection quantity CTiSB is equal to or above a predetermined value (=TIMIN+A) at a step S59, the routine goes to a step S60.

At step S60, control unit 50 corrects effective fuel injection quantity CTiSB at compression stroke by means of the air-fuel mixture feedback correction coefficient α to calculate the final fuel injection quantity CTiS at the compression stroke using the following equation:

$$CTiS = CTiSB \times \alpha \quad (7).$$

If CTiSB<TIMIN+A (No) at step S59, the routine goes to a step S61.

At step S61, control unit 50 determines if feedback correction coefficient α is equal to or above 1.

If α≧1 (the correction of the fuel injection quantity in the increase direction is needed) at step S61 (Yes), the routine goes to a step S60.

At step S60, control unit 50 corrects effective fuel injection quantity CTiSB at the compression stroke with the feedback correction coefficient equal to or above 1 corrected in the increase direction to calculate final fuel injection quantity CTiS.

If α<1 (No) at step S61, control unit 50 determines that the correction of the fuel injection quantity in the decrease direction is needed and the routine goes to a step S62.

At step S62, control unit 50 sets effective fuel injection quantity CTiSB at the compression stroke without decrease directional correction by feedback correction coefficient α as the final fuel injection quantity CTiS.

Figure 12A:
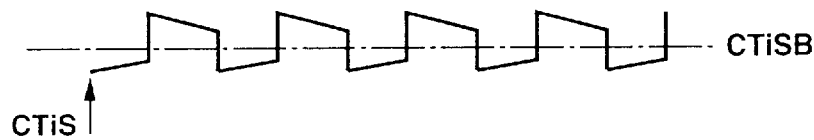
FIGS. 12A and 12B are a timing chart for explaining variation patterns of fuel injection quantities at the suction stroke and at the compression stroke in the fourth example of the fuel injection quantity control procedure shown in FIG. 11 during the stratified stoichiometric combustion.
Figure 12B:

FIGS. 12A and 12B show the variation pattern of the final injection quantity control shown in FIG. 11 is carried out.

In the case where effective fuel injection quantity CTiSB is equal to or above the predetermined value (=TIMIN+A), the fuel injection quantity equal to or above minimum injection quantity TIMIN by which the fuel injection is enabled even if the decrease correction of the fuel injection quantity by means of feedback correction coefficient α is made is secured (refer to FIG. 12A), the increase-directional correction is made for both of the fuel injection quantity CTiH at the suction stroke and that CTiS at the compression stroke. In addition, in a low-load region in which effective fuel injection quantity CTiSB is smaller than predetermined value (=TIMIN+A), only the increase directional correction is made by means of feedback correction coefficient α.

Consequently, while deviation of the divisional ratio is reduced, the normal stratified combustion can be secured. Then a driving region in which no deviation in the divisional ratio of the fuel injection quantity is present and a performance of the stratified stoichiometric combustion can be increased as high as possible can largely be secured.

Figure 13:
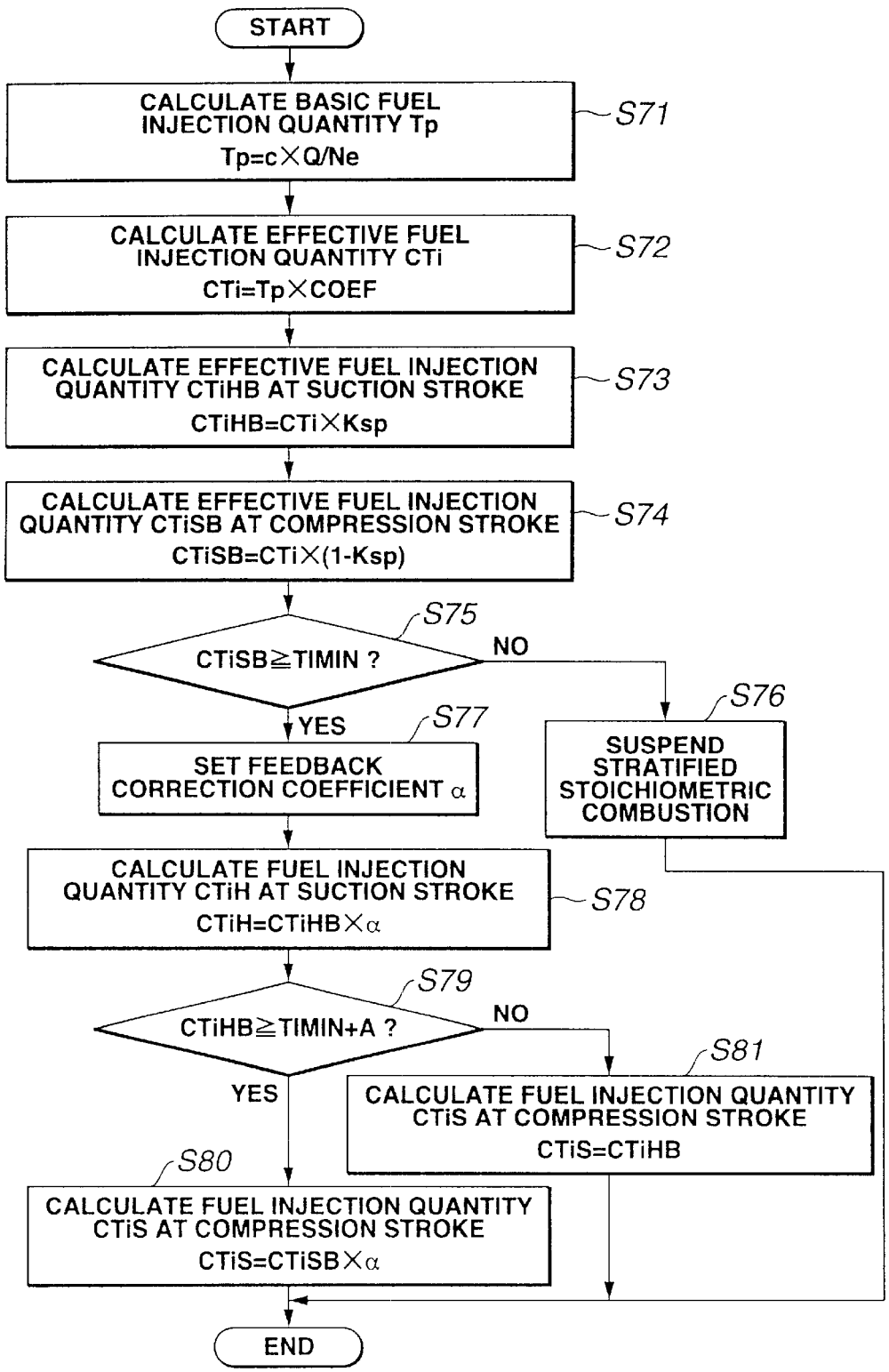
FIG. 13 is an operational flowchart for explaining a fifth example of the fuel injection control procedure executed in the control unit shown in FIGS. 1A and 1B.

Next, FIG. 13 shows a fifth example of fuel injection quantity control procedure during the stratified stoichiometric combustion.

The contents of steps S71 through S80 are the same as those steps S51 through S60 in the fourth example.

While the stratified stoichiometric combustion is executed, fuel injection quantity CTiH at the suction stroke is set with effective fuel injection quantity CTiHB corrected by means of feedback correction coefficient a and that CTiS at the compression stroke is set with effective fuel injection quantity CTiHB corrected by means of feedback correction coefficient α when CTiHB≧(TIMIN+A) at a step S80.

If CTiHB<(TIMIN+A) (No) at step S79, effective fuel injection quantity CTiHB is set directly as final fuel injection quantity CTiS without correction by means of feedback correction coefficient a at a step S81 (CTiS=CTiHB).

Figure 14A:
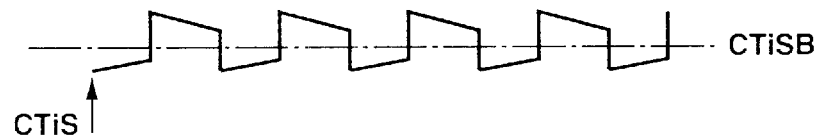
FIGS. 14A and 14B are a timing chart for explaining variation patterns of fuel injection quantity at the compression stroke in the fifth example of the fuel injection quantity control procedure shown in FIG. 13.
Figure 14B:

FIGS. 14A and 14B show the variation pattern of fuel injection quantity at the compression stroke when the fuel injection quantity control shown in FIG. 13 is carried out.

Thus, the drive region in which the normal stratified stoichiometric combustion is secured with a sample control and the performance of the stratified stoichiometric combustion can be increased as high as possible without deviation of the divisional ratio.

Figure 15:
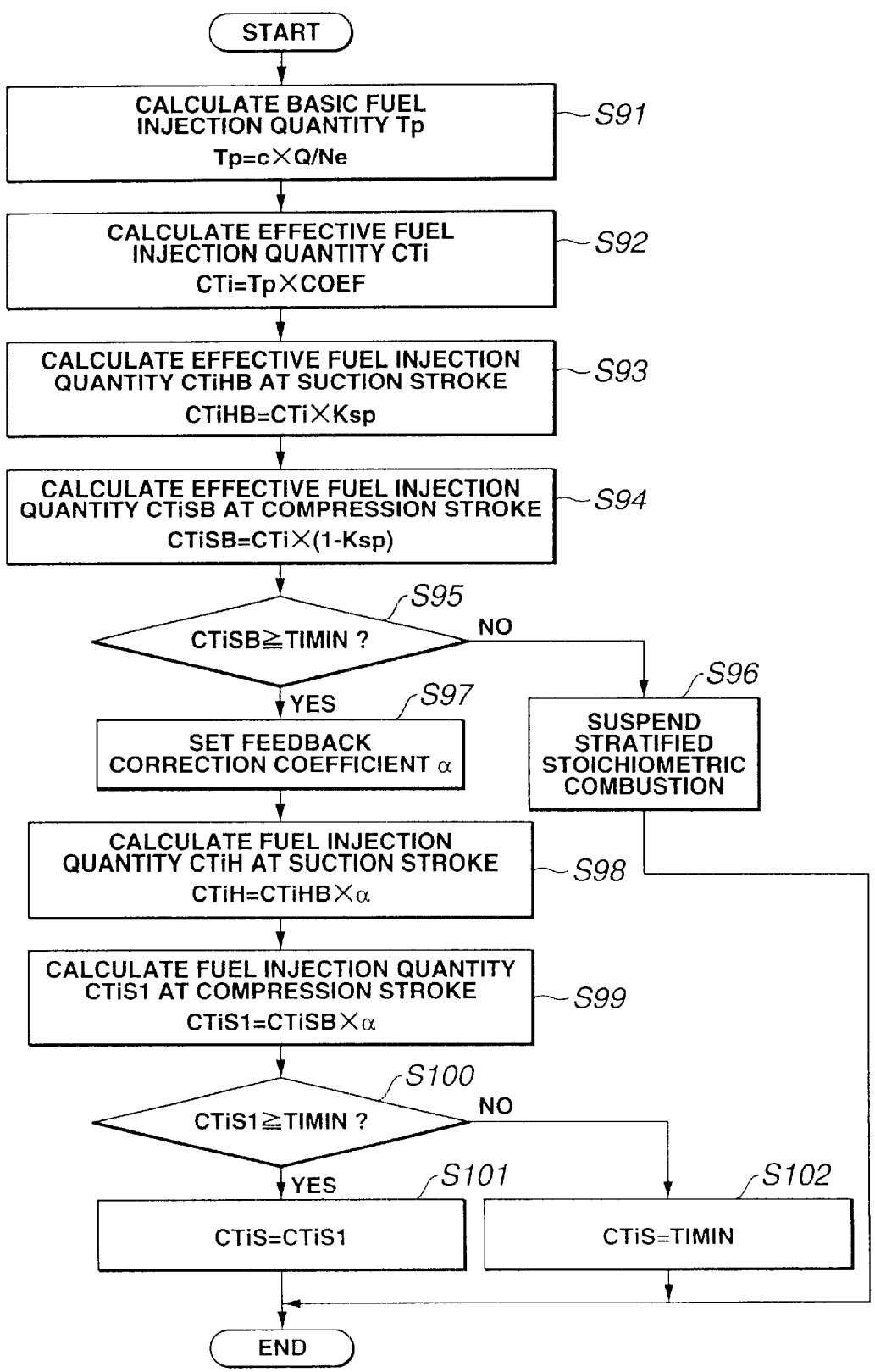
FIG. 15 is an operational flowchart for explaining a sixth example of the fuel injection control procedure executed in the control unit shown in FIGS. 1A and 1B.

Next, FIG. 15 shows an operational flowchart of a sixth example of the fuel injection quantity control procedure during the stratified stoichiometric combustion.

Next, the contents of steps S91 through S98 are the same as those of steps S11 through S18 described in the first example shown in FIG. 3. When the stratified stoichiometric combustion is executed, the fuel injection. quantity CTiH at the suction stroke is set with effective fuel injection quantity CTiHB corrected with feedback correction coefficient α.

At a step S99 in FIG. 15, control unit 50 sets a provisional fuel injection quantity CTiS1 with effective fuel injection quantity CTiSB corrected by means of feedback correction coefficient α for fuel injection quantity CTiS at the compression stroke (CTiS1=CTiSB).

At a step S100, control unit 50 determines if provisional fuel injection quantity CTiS1 is equal to or larger than the minimum fuel injection quantity TIMIN by which the fuel injection is enabled to inject.

If CTiS1≧TIMIN (Yes) at step S100, the routine goes to a step S101.

At step S101, control unit 50 sets provisional fuel injection quantity CTiS1 by means of feedback correction coefficient α as final fuel injection quantity CTiS at the compression stroke (CTiS=CTiS1).

On the other hand, if CTiS<TIMIN (No) at step S100, the routine goes to a step S102.

At step S102, control unit 50 resets minimum fuel injection quantity TIMIN as final fuel injection quantity CTiS at the compression stroke.

Figure 16A:
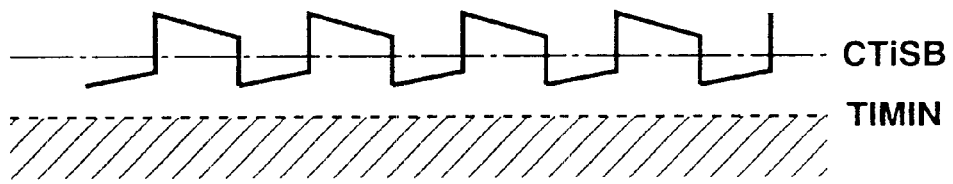
FIGS. 16A and 16B are integrally a timing chart for explaining the variation patterns in the fuel injection quantity injected during the compression stroke in the sixth example of the fuel injection quantity control procedure shown in FIG. 15.
Figure 16B:
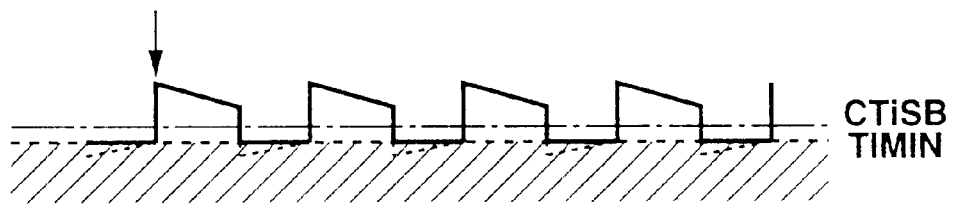

FIGS. 16A and 16B show variation patterns of the fuel injection quantity at the compression stroke when the fuel injection quantity control procedure shown in FIG. 15 is executed.

As shown in FIGS. 16A and 16B, the correction of feedback correction coefficient is executed maintaining one of the fuel injection quantities at the compression and suction strokes which is smaller than the other at the value equal to or larger than the minimum fuel injection quantity. Hence, the deviation between the divisional ratio on the fuel injection quantities is reduced as small as possible and the normal stratified stoichimetric combustion can be secured. At the same time, the drive region in which the performance of the stratified stoichiometric combustion is increased as high as possible without deviation of the divisional ratio can largely be secured.

It is noted that although, for the direct-ignition spark-ignition internal combustion engine to which the control apparatus according to the present invention is applicable, the single combustion chamber has been explained, it is of course that the present invention is applicable to each combustion chamber of the engine cylinders. It is also noted that any one of the operational flowcharts shown in FIGS. 5, 7, 9, 11, 13, and 15 is executed whenever the routine shown in FIG. 2 enters step S7.

The entire contents of a Japanese Patent Application No. Heisei 11-255648 (filed in Japan on Sep. 9, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A control apparatus for a direct-injection spark-ignition internal combustion engine, comprising:
 a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug of the combustion chamber through a fuel injection at a compression stroke; and a second controlling section that corrects a fuel injection quantity of the fuel injection at the suction stroke and a fuel injection quantity of the fuel injection at the compression stroke by use of a feedback correction coefficient so that an average air-fuel ratio over the whole combustion chamber is controlled to be a predetermined target air-fuel ratio, wherein one of the fuel injections whose fuel injection quantity is larger than the other fuel injection is corrected in both increase and decrease directions by use of the feedback correction coefficient, and wherein the other fuel injection is corrected only in an increase direction by use of the feedback correction coefficient.

2. A control apparatus for a direct-injection spark-ignition internal combustion engine, comprising:

a fuel injector that injects fuel directly into a combustion chamber;

an air-fuel ratio sensor provided in an exhaust passage of the engine; and a controller that is programmed to:
set a feedback correction coefficient on the basis of an air-fuel ratio detected by the air-fuel ratio sensor in such a manner that the air-fuel ratio indicates a predetermined target air-fuel ratio;

perform a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in an inner space surrounding the spark plug through a fuel injection at a compression stroke; and correct a fuel injection quantity of the fuel injection whose fuel injection quantity is larger than the other fuel injection by use of the feedback correction coefficient in both increase and decrease directions, and correct a fuel injection quantity of the other fuel injection by use of the feedback correction coefficient only in an increase direction.

3. A control apparatus for a direct-injection spark-ignition internal combustion engine as claimed in claim 2, wherein the predetermined target air-fuel ratio is a stoichiometric air-fuel ratio.

4. A control apparatus for a direct-injection spark-ignition internal combustion engine as claimed in claim 2, wherein the control apparatus further comprises a catalytic converter installed in an exhaust passage, and wherein the predetermined condition is a condition prior to a completion of an activation of the catalytic converter.

5. A control apparatus for a direct-injection spark-ignition internal combustion engine as claimed in claim 4, wherein the control apparatus further comprises a temperature sensor that detects a temperature of an engine coolant, and wherein the completion of the activation of the catalytic converter is determined on the basis of the detected engine coolant temperature.

6. A control apparatus for a direct-injection spark-ignition internal combustion engine as claimed in claim 2, wherein the controller divides a target fuel injection quantity to be injected in a stroke with a divisional ratio, the divided fuel injection quantity at the suction stroke being larger than that at the compression stroke.

7. A control apparatus for a direct-injection spark-ignition internal combustion engine, comprising:

a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug of the combustion chamber through a fuel injection at a compression stroke; and a second controlling section that corrects a fuel injection quantity of the fuel injection whose fuel injection quantity is larger than the other fuel injection quantity by use of a feedback correction coefficient so that an average air-fuel ratio over the whole combustion chamber is controlled to be a predetermined target air-fuel ratio, and suspends to correct a fuel injection quantity of the other fuel injection by use of the feedback correction coefficient.

8. A control apparatus for a direct-injection spark-ignition internal combustion engine, comprising:

a fuel injector that injects fuel directly into a combustion chamber;

a spark plug provided in the combustion chamber;

an air-fuel ratio sensor provided in an exhaust passage of the engine; and a controller that is programmed to:
set a feedback correction coefficient on the basis of an air-fuel ratio detected by the air-fuel ratio sensor in such a manner that the air-fuel mixture ratio indicates a predetermined target air-fuel ratio; and perform a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in an inner space surrounding the spark plug through a fuel injection at a compression stroke; and correct a fuel injection quantity of the fuel injection whose fuel injection quantity is larger than the other fuel injection by use of the feedback correction coefficient, and suspend to correct a fuel injection quantity of the other fuel injection by use of the feedback correction coefficient.

9. A control apparatus for a direct-injection spark-ignition internal combustion engine as claimed in claim 8, wherein the predetermined target air-fuel ratio is a stoichiometric air-fuel ratio.

10. A control apparatus for a direct-injection spark-ignition internal combustion engine, comprising:

a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a sparkplug at the combustion chamber through a fuel injection at a compression stroke;

a second controlling section that performs a first control mode, the first control mode correcting a fuel injection quantity of the fuel injection at the suction stroke and a fuel injection quantity of the fuel injection at the compression stroke by use of a feedback correction coefficient in both increase and decrease directions so that an average air-fuel ratio over the whole combustion chamber is controlled to be a predetermined target air-fuel ratio;

a third controlling section that performs a second control mode, the second control mode correcting a fuel injection quantity of the fuel injection at the suction stroke and a fuel injection quantity of the fuel injection at the compression stroke by use of the feedback correction coefficient so that an average air-fuel ratio over the whole combustion chamber is controlled to be the predetermined target air-fuel ratio, wherein one of the fuel injections whose fuel injection quantity is larger than the other fuel injection is corrected in both increase and decrease directions by use of the feedback correction coefficient, and wherein the other fuel injection is corrected only in an increase direction by use of the feedback correction coefficient; and a switching section that switches a control mode between the first control mode and the second control mode based on an engine operating condition.

11. A control apparatus for a direct-injection spark-ignition internal combustion engine, comprising:

a fuel injector that injects fuel directly into a combustion chamber;

a spark plug provided in the combustion chamber;

an air-fuel ratio sensor provided in an exhaust passage of the engine;

a feedback correction coefficient setting section that sets a feedback correction coefficient on the basis of an air-fuel ratio detected by the air-fuel ratio sensor in such a manner that the air-fuel ratio indicates a predetermined target air-fuel mixture ratio;

a stratified combustion controlling section that performs a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in an inner space surrounding the spark plug through a fuel injection at a compression stroke;

a control mode switching section that switches a control mode between a first control mode and a second control mode based on an engine operating condition, the first control mode correcting a fuel injection quantity of the fuel injection at the suction stroke and a fuel injection quantity of the fuel injection at the compression stroke by use of the feedback correction coefficient wherein one of the fuel injections whose fuel injection quantity is larger than the other fuel injection is corrected in both increase and decrease directions by use of the feedback correction coefficient and wherein the other fuel injection is corrected only in an increase direction by use of the feedback correction coefficient.

12. A control apparatus for a direct-injection spark-ignition internal combustion engine as claimed in claim 11, wherein the control mode switching section switches the control mode on the basis of whether the fuel injection quantity of the other fuel injection is larger than or equal to a predetermined quantity.

13. A control apparatus for a direct-injection spark-ignition internal combustion engine as claimed in claim 12, wherein the predetermined quantity is expressed as (TIMIN+A), wherein TIMIN denotes a minimum fuel injection quantity of the fuel injector enabled to inject and A denotes an injection quantity corresponding to a largest deviation of the feedback correction coefficient in the decrease direction.

14. A control apparatus for a direct-injection spark-ignition internal combustion engine, comprising:

a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug of the combination chamber through a fuel injector at a compression stroke;

a second controlling section that performs a first control mode, the first control mode correcting a fuel injection quantity of the fuel injection at the suction stroke and a fuel injection quantity of the fuel injection at the compression stroke by use of a feedback correction coefficient in both increase and decrease directions so that an average air-fuel ratio over the whole combustion chamber is controlled to be a predetermined target air-fuel ratio;

a third controlling section that performs a second control mode, the second control mode correcting a fuel injection quantity of the fuel injection whose fuel injection quantity is larger than the other fuel injection by use of the feedback correction coefficient in both increase and decrease directions and suspending to correct a fuel injection quantity of the other fuel injection by use of the feedback correction coefficient; and a switching section that switches a control mode between the first control mode and the second mode based on an engine operating condition.

15. A control apparatus for a direct-injection spark-ignition internal combustion engine, comprising:

a fuel injector that injects fuel directly into a combustion chamber;

a spark plug provided in the combustion chamber;

an air-fuel ratio sensor provided in an exhaust passage of the engine;

a feedback correction coefficient setting section that sets a feedback correction coefficient on the basis of an air-fuel ratio detected by the air-fuel ratio sensor in such a manner that the air-fuel ratio indicates a predetermined target air-fuel ratio;

a stratified combustion controlling section that performs a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in an inner space surrounding the spark plug through a fuel injection at a compression stroke; and a control mode switching section that switches a mode between a first control mode and a second control mode based on an engine operating condition, the first control mode correcting a fuel injection quantity of the fuel injection at the suction stroke and a fuel injection quantity of the fuel injection at the compression stroke by use of the feedback correction coefficient in both increase and decrease directions, the second control mode correcting a fuel injection quantity of the fuel injection whose fuel injection quantity is larger than the other fuel injection by use of the feedback correction coefficient in both increase and decrease directions, and suspending to correct a fuel injection quantity of the other fuel injection by use of the feedback correction coefficient.

16. A control apparatus for a direct-injection spark-ignition internal combustion engine, comprising:

a first controlling section that performs a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug of the combustion chamber through a fuel injection at a compression stroke; and a second controlling section that corrects a fuel injection quantity at the suction stroke and a fuel injection quantity of the fuel injection at the compression stroke by use of a feedback correction coefficient so that an air-fuel mixture ratio over the whole combustion chamber is controlled to be a predetermined target air-fuel ratio, wherein one of the fuel injections whose fuel injection quantity is larger than the other fuel injection is corrected in both increase and decrease directions by use of the feedback correction coefficient and the other fuel injection is corrected in both increase and decrease directions by use of the feedback correction coefficient so as to be limited to a quantity greater than or equal to a minimum quantity.

17. A control apparatus for a direct-injection spark-ignition internal combustion engine, comprising:

a fuel injector that injects fuel directly into a combustion chamber;

a spark plug provided in the combustion chamber;

an air-fuel ratio sensor provided in an exhaust passage of the engine; and a controller that is programmed to:
set a feedback correction coefficient on the basis of an air-fuel ratio detected by use of the air-fuel ratio sensor in such a manner that the air-fuel ratio indicates a predetermined target air-fuel ratio;

perform a stratified combustion to raise an exhaust temperature under a predetermined condition, the stratified combustion being provided with a lean air-fuel mixture formed over the whole combustion chamber through a fuel injection at a suction stroke and a rich air-fuel mixture formed in inner space of the combustion chamber surrounding the spark plug through a fuel injection within the combustion chamber at a compression stroke; and correct a fuel injection quantity of the fuel injection at the suction stroke and a fuel injection quantity of the fuel injection at the compression stroke by use of the feedback correction coefficient so that the detected air-fuel ratio is controlled to be a predetermined target air-fuel ratio, wherein one of the fuel injections whose fuel injection quantity is larger than the other fuel injection is corrected in both increase and decrease directions by use of the feedback correction coefficient so as to be limited to a quantity greater than or equal to a minimum quantity.

18. A control method for a direct-injection spark-ignition internal combustion engine, comprising:

forming a stratified combustion to raise an exhaust temperature under a condition prior to a completion of an engine warm-up, the stratified combustion being provided with a lean air-fuel mixture formed over a whole combustion chamber through a fuel injection at a suction stroke and a rich air-fuel mixture formed in an inner space surrounding a spark plug at the combustion chamber through a fuel injection at a compression stroke; and correcting a fuel injection quantity of the fuel injection at the suction stroke and a fuel injection quantity of the fuel injection at the compression stroke by use of a feedback correction coefficient so that an average air-fuel ratio over the whole combustion chamber is controlled to be a predetermined target air-fuel ratio, wherein one of the fuel injections whose fuel injection quantity is larger than the other fuel injection is corrected in both increase and decrease directions by use of the feedback correction coefficient, and wherein the other fuel injection is corrected only in an increase direction by use of the feedback correction coefficient.

* * * * *